(12) United States Patent
Bai et al.

(10) Patent No.: US 8,830,230 B2
(45) Date of Patent: Sep. 9, 2014

(54) SENSOR PLACEMENT AND ANALYSIS USING A VIRTUAL ENVIRONMENT

(75) Inventors: Hao Bai, Beijing (CN); Henry Chen, Beijing (CN); Jian Geng Du, Beijing (CN); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 770 days.

(21) Appl. No.: 13/017,969

(22) Filed: Jan. 31, 2011

(65) Prior Publication Data

US 2012/0197600 A1 Aug. 2, 2012

(51) Int. Cl.
*G06T 15/00* (2011.01)
*G08B 13/196* (2006.01)
*G06T 15/20* (2011.01)

(52) U.S. Cl.
CPC ............ *G08B 13/1968* (2013.01); *G06T 15/20* (2013.01)
USPC .......................................... 345/419; 345/473

(58) Field of Classification Search
None
See application file for complete search history.

(56) References Cited

U.S. PATENT DOCUMENTS

| | | | | |
|---|---|---|---|---|
| 6,097,394 | A * | 8/2000 | Levoy et al. | 345/419 |
| 6,417,861 | B1 * | 7/2002 | Deering et al. | 345/589 |
| 8,090,160 | B2 * | 1/2012 | Kakadiaris et al. | 382/118 |
| 2004/0105573 | A1 * | 6/2004 | Neumann et al. | 382/103 |
| 2004/0174376 | A1 * | 9/2004 | Deering | 345/592 |
| 2007/0236485 | A1 * | 10/2007 | Trepte | 345/207 |

* cited by examiner

*Primary Examiner* — Said Broome
(74) *Attorney, Agent, or Firm* — Schwegman Lundberg & Woessner, P.A.

(57) ABSTRACT

A process for sensor placement and analysis using a virtual environment includes receiving into a computer processor a model of an area, a position in the model that represents a placement of a virtual sensor, and an orientation of the virtual sensor. A shadow map of the area is generated as a function of the position and orientation of the virtual sensor. The shadow map is used to determine one or more portions of the area that can be sensed by the virtual sensor. The area of the model that is covered as a function of the position and orientation of the virtual sensor is determined, and information relating to the area of the model that is covered as a function of the position and orientation of the virtual sensor is transmitted to an output device.

16 Claims, 10 Drawing Sheets

SENSOR PLACEMENT AND ANALYSIS USING A VIRTUAL ENVIRONMENT

TECHNICAL FIELD

The present disclosure relates to sensor placement and analysis using a virtual environment.

BACKGROUND

Video surveillance has been a much used security tool for years, and as a result of new breakthroughs in technology, security cameras are more effective than ever. Critical infrastructure, banks, retail stores, and countless other end-users depend on the protection provided by video surveillance. In the art of video surveillance, camera placement is becoming more complex and costly. Traditionally, two dimensional floor plan or site map-based automatic camera placement approaches has addressed the problem to some extent. This simplifies the problem by estimating the camera coverage area on a two dimensional plane. However, this provides only an approximate solution because these approaches ignore the elevation or height of structures in the area to be monitored. For example, it is difficult for this approach to distinguish an occlusion by a half wall (such as cubicle or desk) or a whole wall. Therefore, it is helpful to visualize and evaluate the approximate solution so as to give a precise solution to meet the video surveillance requirement, especially for critical infrastructures, before the installation of the surveillance system.

While two dimensional floor plans have been widely used, three dimensional geometry models of buildings are now available (for example, the BIM model). With the three dimensional model, it is possible to adopt the geometry technology to calculate the coverage area on the surface object, such as a floor, a wall, or a column, according to the frustum of the camera. Normally, a three dimensional method will export three dimensional polygons as the coverage area and then highlight these polygons to visualize the coverage area. The method can consider the occlusion effect and the altitude of the camera in the 3D environment. However the computing of the occlusion region is very intensive. Additionally, it is difficult to provide interactive operation for camera placement, such as real time adjustment of a camera's extrinsic parameters (position, orientation) and intrinsic parameters (field of view, focus length).

DETAILED DESCRIPTION

Figure 1A:
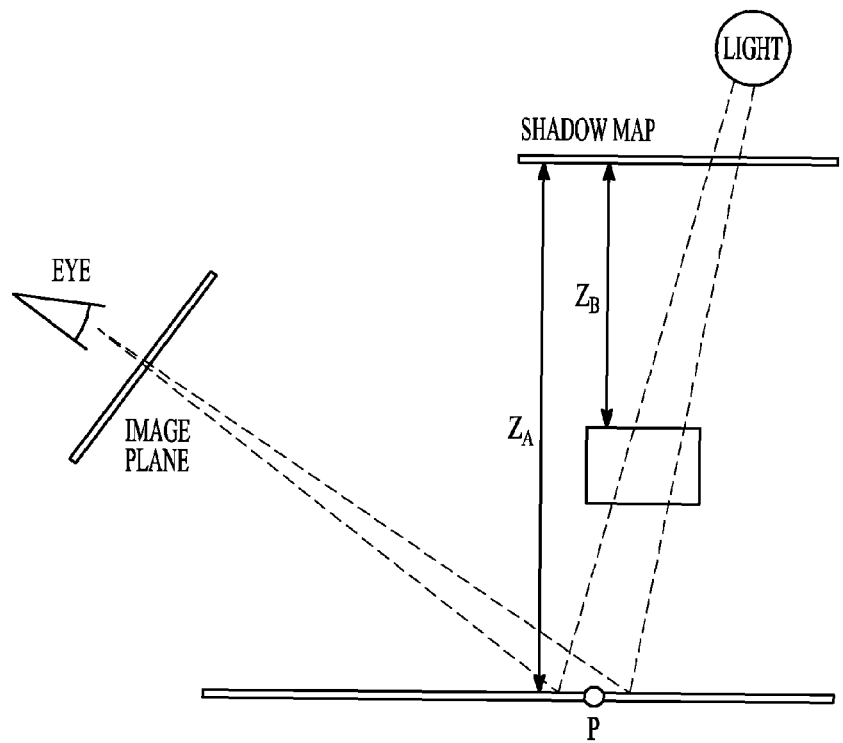
FIGS. 1A and 1B illustrate shadow-mapping technology.

In an embodiment, a method to precisely visualize and evaluate a camera placement solution not only avoids imprecision caused by a two dimensional method, but also avoids the slow response caused by a three dimensional geometry calculation. The method not only provides real time interactive visualization of camera coverage for adjusting the camera's parameters, but also provides precise evaluation of the performance of the camera placement solution. Additionally, the method not only provides an intuitive display of camera placement, but also provides quantitative analysis of the performance of camera placement.

In an embodiment, a three dimensional model of a building, structure, or other area, and parameters of a sensor, are used in connection with shadow mapping technology to visualize the portion of the area that can be sensed by the sensor. This disclosure focuses on the use of a video sensing device, but other sensors can be employed such as radar or a millimeter wave (MMW) sensor. There are several aspects to the embodiments disclosed herein. First, using shadow mapping technology (or a related technology), the coverage of an area in a three dimensional environment can be visualized in real time. A user can customize the texture of the coverage area or overlap area. A user can also directly manipulate a virtual camera in a three dimensional display of the coverage area. Second, all possible three dimensional coverage areas can be calculated and displayed for a video sensing device that can pan, tilt, and zoom. Also, selected fidelity constraints can be calculated and displayed (e.g., requiring at least 50×50 pixels for a square foot area). Third, resolutions of different locations in the coverage area can be calculated and displayed, and the resolutions can be displayed as a density map, a color map, or a contour map. Fourth, a user can define a surveillance area in a three dimensional graphic, and the performance of a video sensing device is quantitatively analyzed, such as coverage percentage, overlap area, and areas that no video sensing device can cover. This information can be highlighted to remind a user to refine the placement of the video sensing devices. Fifth, a two dimensional or three dimensional image can be exported to an output device, wherein a user can view and study the output, and then determine the locations in the building or structure to put the video sensing devices to get the most coverage at the least cost.

Shadow mapping technology is widely used in real-time rendering to render high fidelity shadow effect. In an embodiment, shadow mapping technology is used for data visualization to display the camera coverage area in real-time. Shadow mapping is referred to as a two pass technology. In the first pass, a scene is rendered from a first position, normally referred to as the light position (without light and color), and the depth of each pixel is stored into a shadow map. In the second pass, the scene is rendered from a second position, normally referred to as the eye's position, but with the shadow map projected onto the scene from the position of the light using the technology of projective texture. Each pixel in the scene receives a value of depth from the position of the light. At each pixel, the received value of depth is compared with the fragment's distance from the light. If the latter is greater, the pixel is not the closest one to the light, and it cannot be illuminated by the light.

Figure 1B:
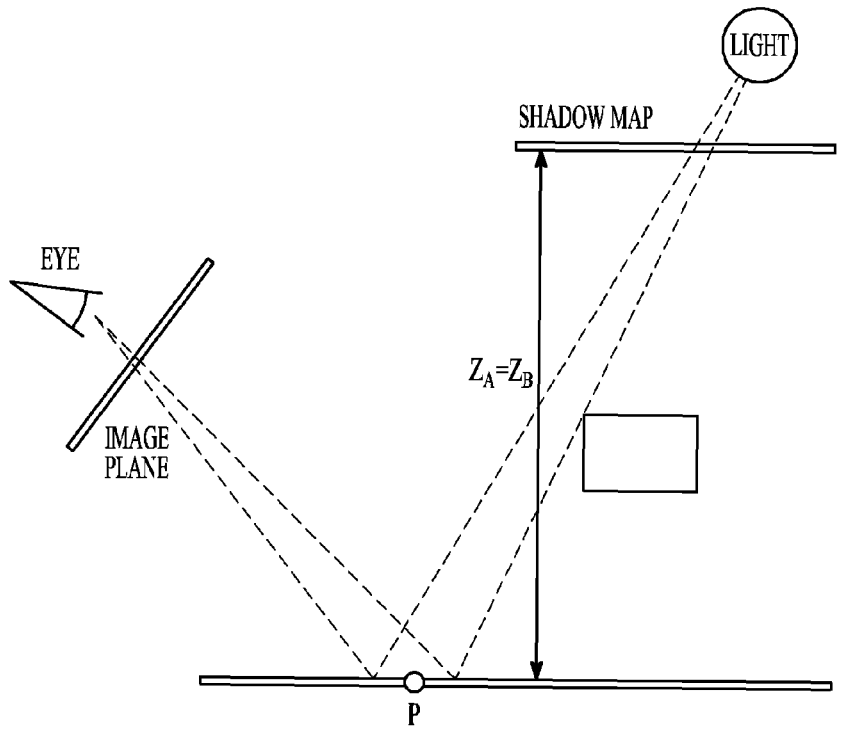

FIGS. 1A and 1B illustrate the two pass technology of shadow mapping and the associated depth comparison. In FIG. 1A, the point P is in shadow because the depth of P ($Z_B$) is greater than the depth recorded in the shadow map ($Z_A$). In contrast, in FIG. 1B, the point P can be illuminated because the depth of P ($Z_B$) is equal to the depth of the shadow map ($Z_A$).

Figure 2A:
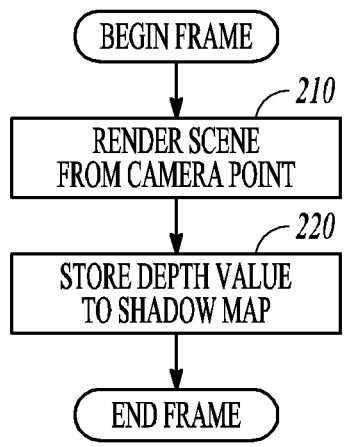
FIGS. 2A and 2B are a flowchart illustrating a process to determine a coverage area of a virtual camera.
Figure 2B:
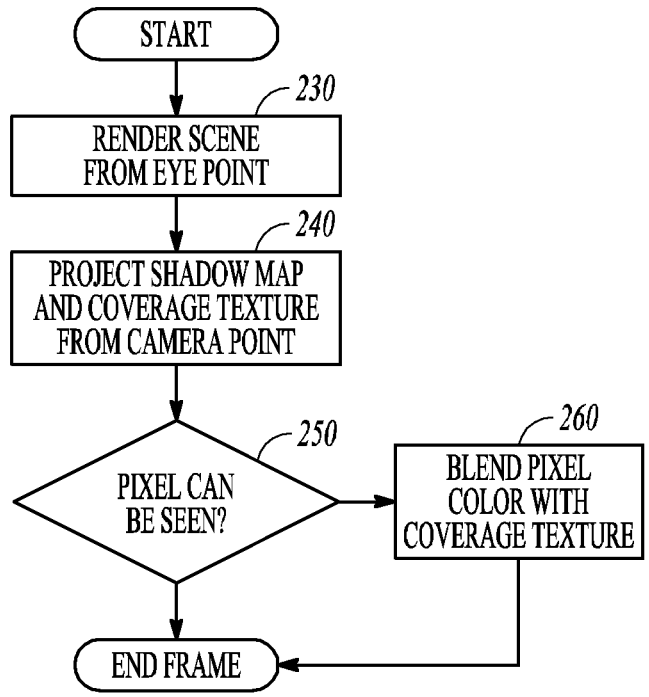

FIGS. 2A and 2B illustrate the application of the two pass shadow mapping technology to an embodiment. In order to project a predefined texture to a scene to show the effect of the coverage of a video sensing device, a process of project coverage texture to the scene is added to shadow mapping, and the light for the shadow mapping is defined as the camera. Referring to FIG. 2A, at 210, the scene is rendered from the camera point of view, and at 220, the depth value is stored in the shadow map. In the second stage of FIG. 2B, at 230, the scene is rendered from the point of view of the eye, and the shadow map and the coverage texture is projected from the camera point at 240. Then, at 250, for each pixel rendered in the second stage, if a pixel can be illuminated from the light position (in this application it means that the pixel can be seen from the camera), the pixel will blend the color of the coverage texture projected from the camera position based on the projection transform of the camera (260). Otherwise, the pixel will leave the original color.

Figure 3:
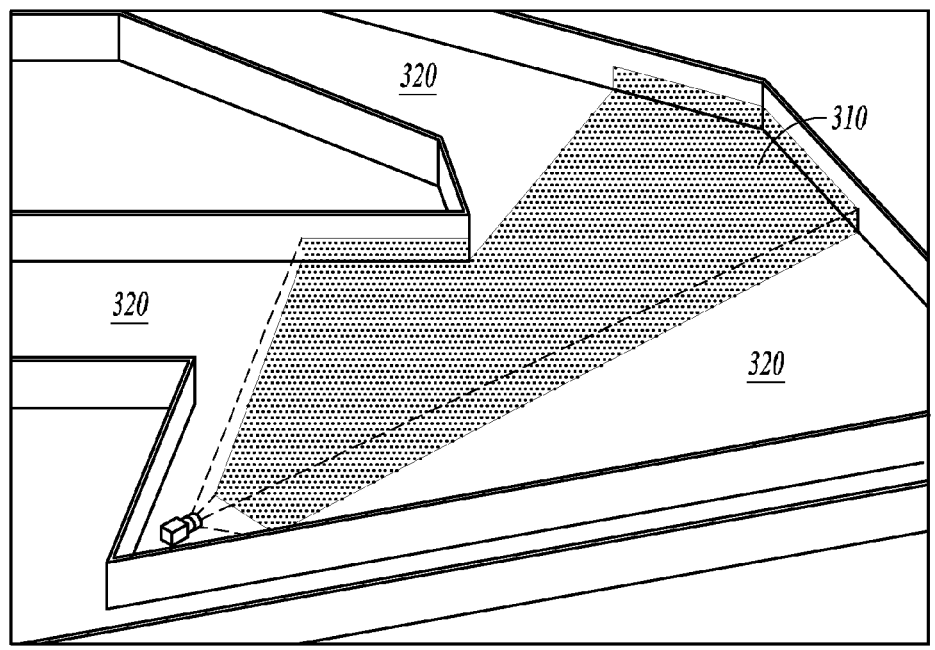
FIG. 3 illustrates an occlusion effect display of a virtual camera.

FIG. 3 illustrates an example of an occlusion effect as determined by an embodiment. The display of an occlusion effect provides feedback to users so that the users can evaluate if a position or orientation of a video sensing device is suitable. Shadow mapping technology can handle the problem of an occlusion effect. Specifically, a traditional shadow mapping effect renders the region which cannot receive light from a given light point with deeper color. However, in an embodiment, a texture is rendered to the region that is visible from the camera (310) with a predefined texture, and the region that is occluded (320) is left as the original color instead. This provides a user with a clear display of the occlusion effect.

Figure 4:
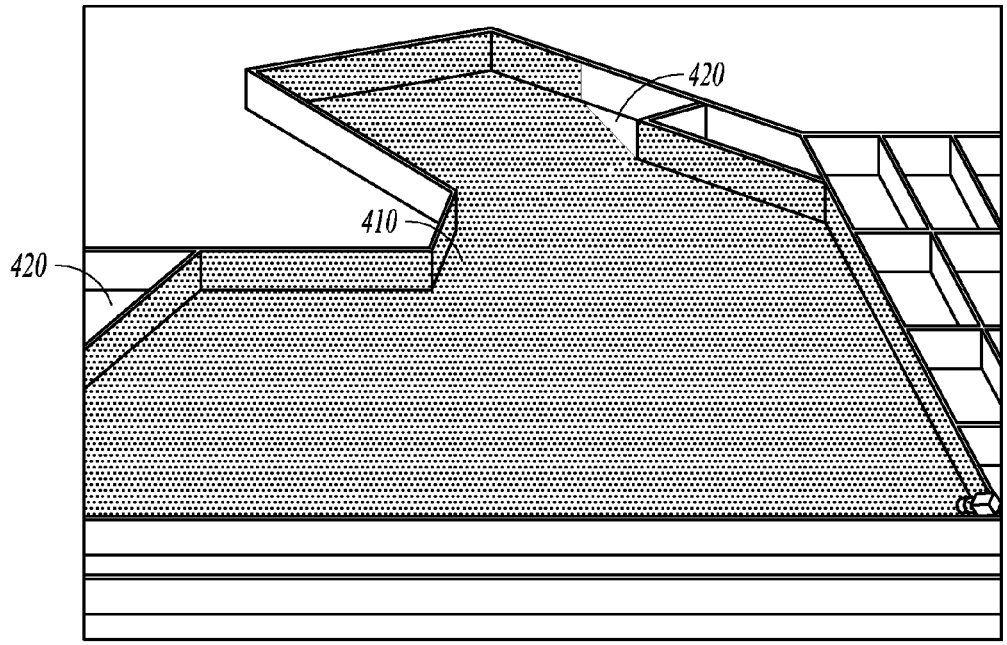
FIG. 4 illustrates all possible coverage areas of a virtual camera.

An embodiment provides for all coverage possibilities with a video sensing device that can pan, tilt, and zoom (PTZ). Once again, with a PTZ video sensing device, the possible coverage region of the video sensing device at a particular position is the same as the region that a light at that position can illuminate. An embodiment can compute and display the coverage region of a video sensing device in the scene. This is illustrated in FIG. 4. Area 410 indicates the coverage area, and area 420 indicates an area that cannot be covered by this position and orientation of the video sensing device. The possible coverage of a video sensing device can be important feedback for the user, and it can show if the video sensing device at a particular location and orientation can cover an expected region. If not, the user can virtually relocate the video sensing device to determine if a different location and orientation would cover an expected or desired region.

Fidelity constraints within the coverage region can also be considered and displayed. Normally, data that is captured by video sensing devices in a surveillance system have a fidelity constraint. Video data are useless if the image is too blurry to identify. One of the key parameters to identify the quality of the video is the resolution of the data. The resolution can be calculated by the following equation:

$$\text{resolution} = \frac{\text{number\_pixels}_{horizontal} * \text{focal\_length}}{\text{image\_width} * \text{camera\_distance}}$$

Figure 5:
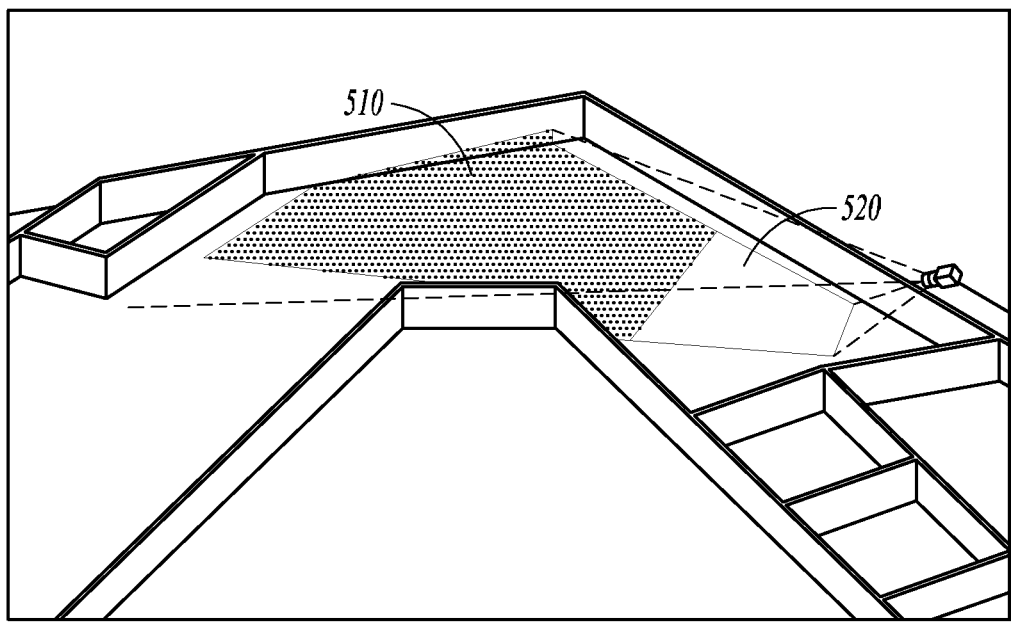
FIG. 5 illustrates a coverage region and a resolution constraint of a virtual camera.

Usually, the pixel number and image width are fixed, so the resolution is mainly a function of the focal length of the video sensing device and the distance between the video sensing device and the point of observation. Generally, a minimum resolution is defined to guarantee a particular quality to the video data. In order to show the coverage region that satisfies the requirement of the resolution, the coverage region is divided into two different parts. As illustrated in FIG. 5, region 510 indicates an area that can be seen from the perspective of the video sensing device, but which cannot satisfy the requirement of the resolution. Region 520 indicates where data can be captured by the video sensing device with suitable resolution.

Figure 6:
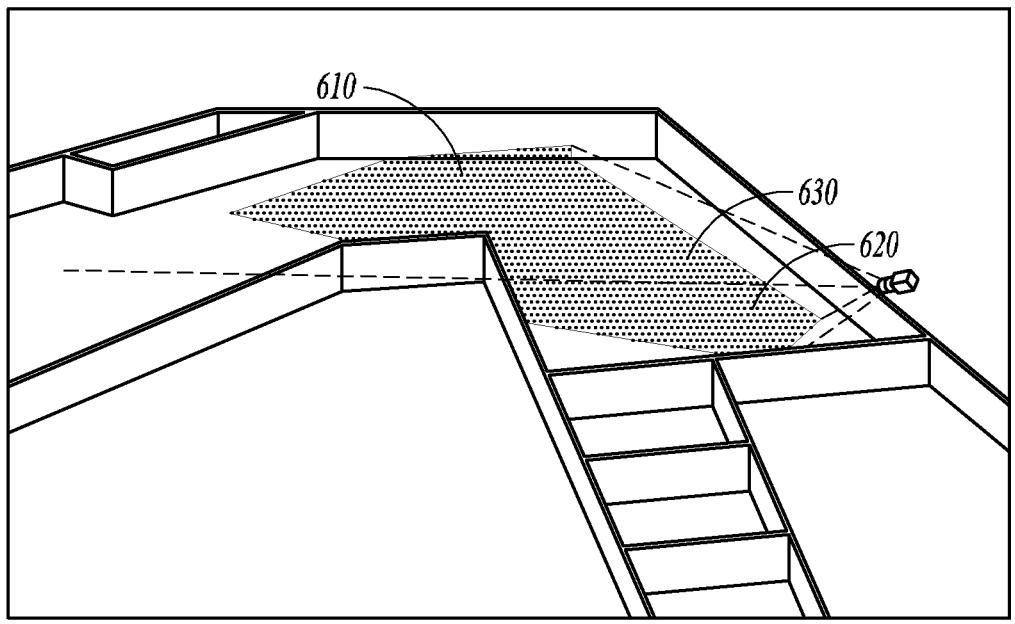
FIG. 6 illustrates a coverage region and a resolution of a virtual camera.

In some cases, it is not enough for the users to optimize the solutions of camera placement with only the display of the region with a resolution constraint because they want to get more information to evaluate the camera placement. For this reason, a color map can be adopted to get a much more intuitive visualization effect of the distribution of the resolution. As FIG. 6 illustrates, the gradient color effect projected to the coverage area represents the gradual change of the resolution with the distance between the observed area and the camera. For example, region 620 would be displayed with a warm color such as red, and this would mean that the area 620 in the display has a high resolution and can satisfy the resolution constraint. Otherwise, a cool color such as blue would be displayed as in region 610, and this means the area 610 in the display may have a low resolution, and it may fail to meet the fidelity requirement. Area 630 illustrates an area of intermediate resolution. Consequently, users should place the camera so that the coverage area is rendered with warm colors, thereby indicating an acceptable fidelity.

In an embodiment, a widget can be used in connection with modifying parameters of the virtual video sensing device. Widgets can improve the efficiency of users who are modifying the configuration of camera placement. This can provide users with an intuitive feeling in a three dimensional environment.

Figure 7A:
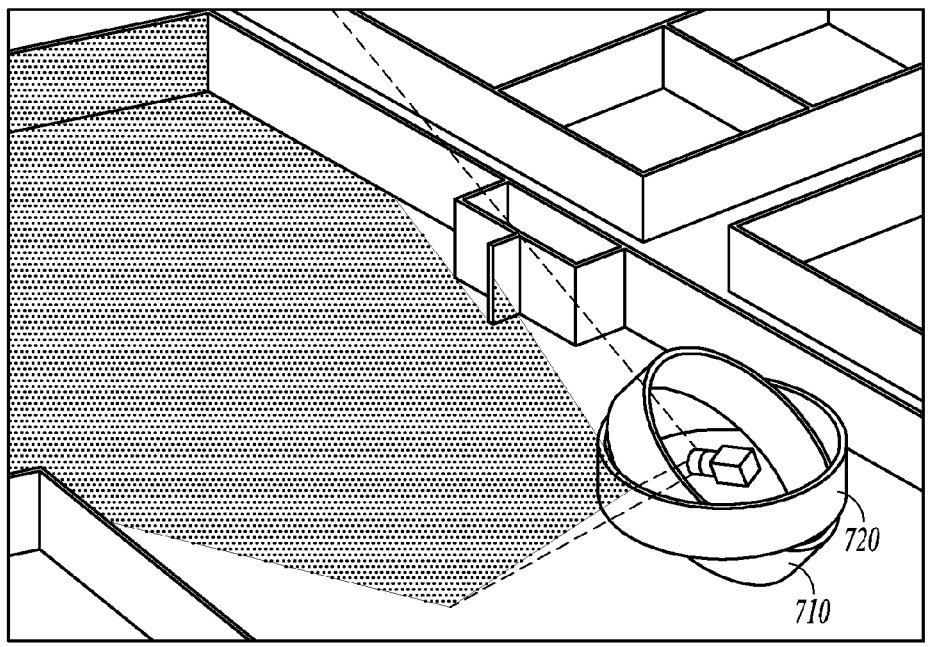
FIGS. 7A and 7B illustrate a use of a widget to implement a pan and tilt operation of a virtual camera.
Figure 7B:
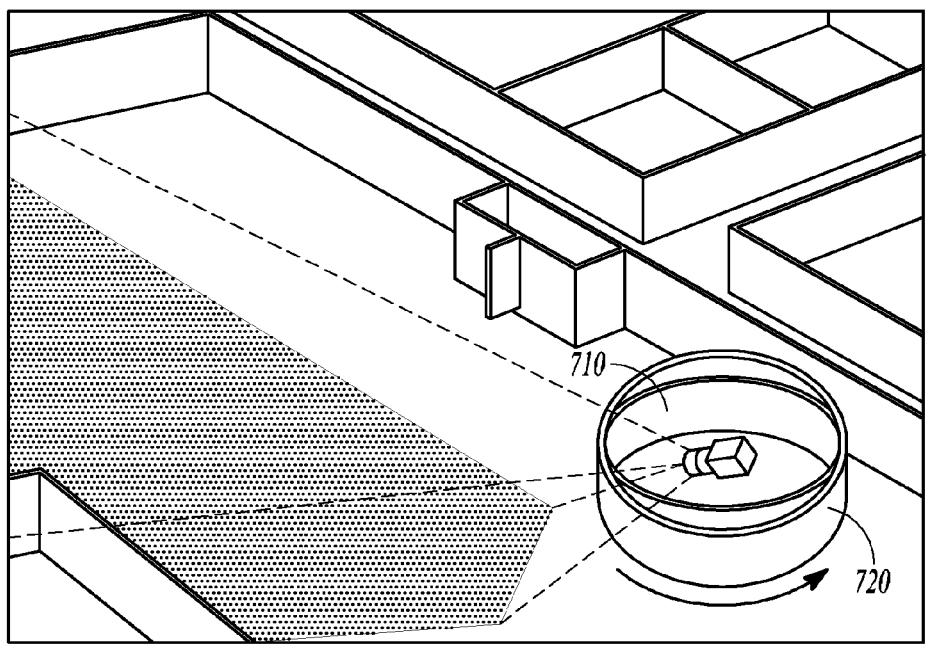
Figure 8A:
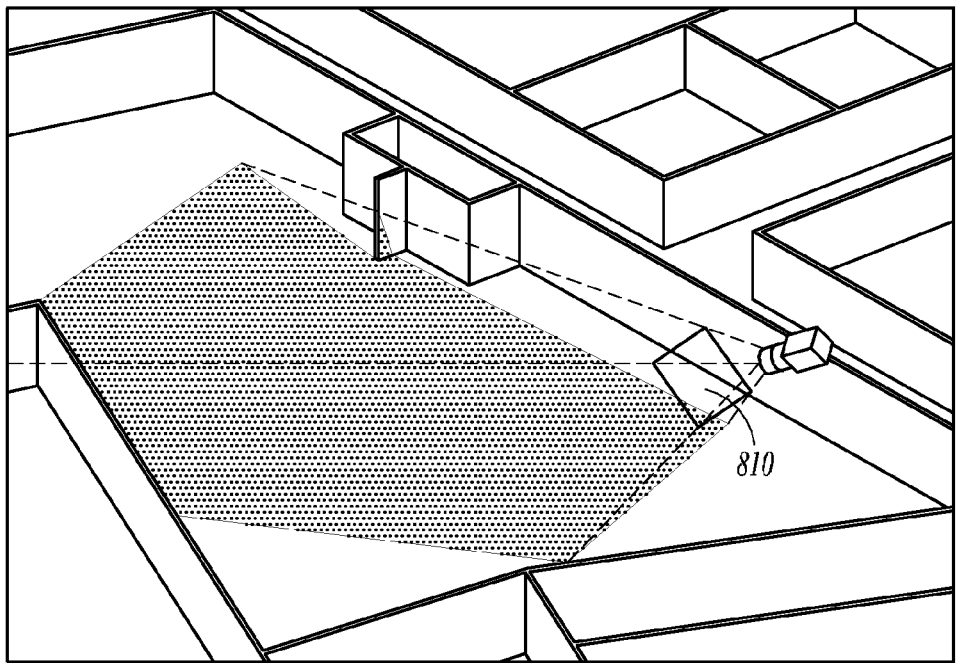
FIGS. 8A and 8B illustrate a zoom of a virtual camera.
Figure 8B:
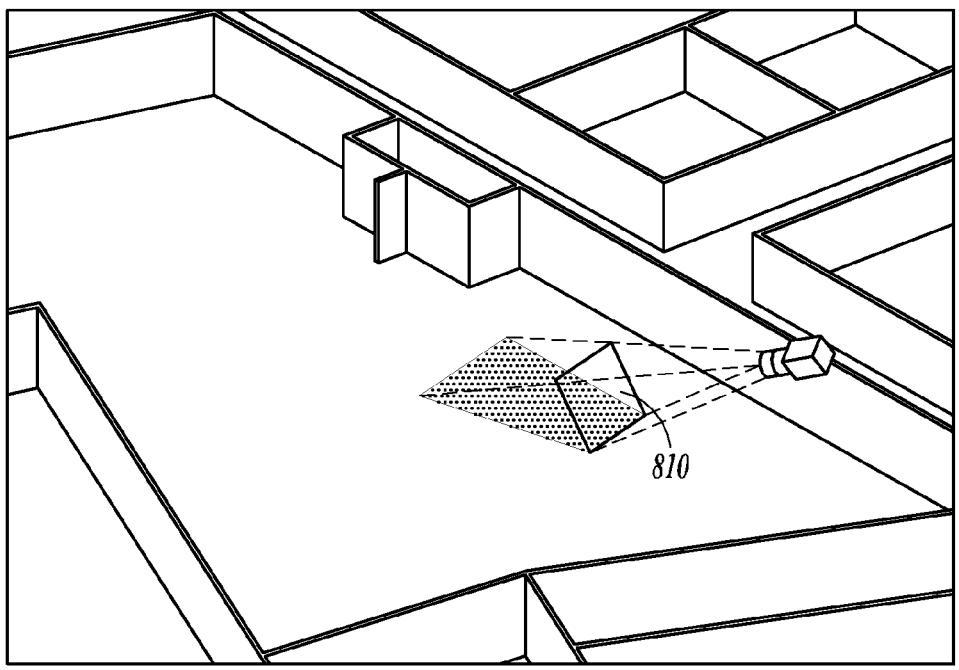

A pan and tilt operation is based on a rotate operation. Consequently, two ring widgets can be employed to give a user a convenient operation method. A user can click the ring and drag the ring just as a user would rotate the ring in the real world. The virtual camera will respond by rotating by the attitude of the rings. This feature is illustrated in FIGS. 7A and 7B as ring widgets 710 and 720. The zoom operation changes the value of the field of depth of the camera. To implement a zoom feature, as is illustrated in FIGS. 8A and 8B, a plane 810 is employed that can be dragged along the direction of the virtual video sensing device, and the distance between the plane and camera represents the field of depth. This is illustrated in FIGS. 8A and 8B.

There are several parameters that can be considered for the fidelity constraints. After the configuration of the camera placement, the system can output a configuration file that contains the position, pan, tilt, zoom, and the selected type of camera. These parameters can be used to install the cameras and configure the surveillance system. An embodiment can also output a two dimensional floor plan drawing with the virtual cameras' positions and directions. This can provide guidance to the installation of the cameras.

Figure 9:
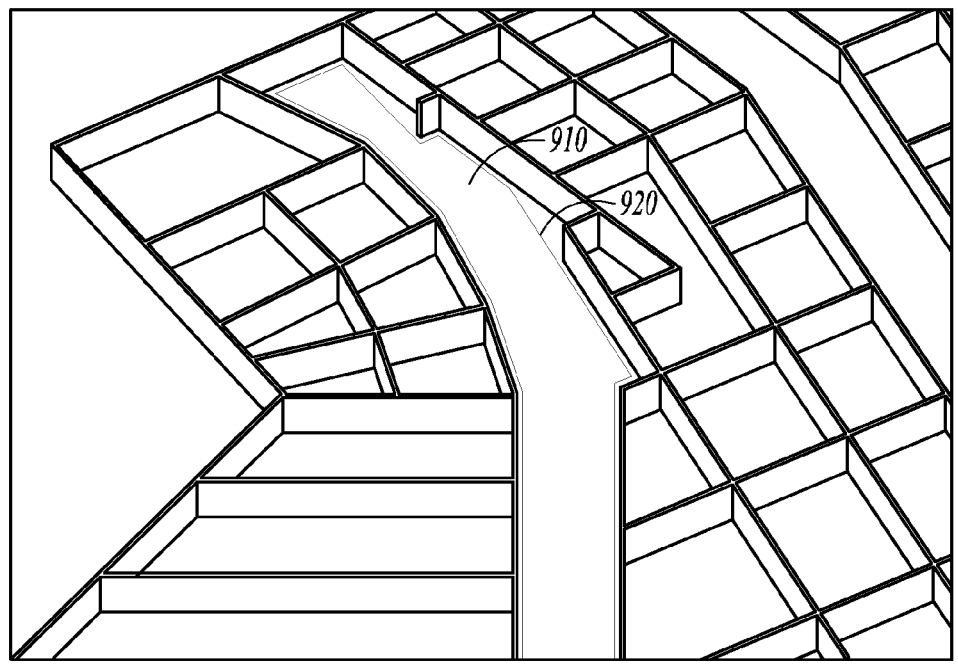
FIG. 9 illustrates a surveillance region of a virtual camera.
Figure 10:
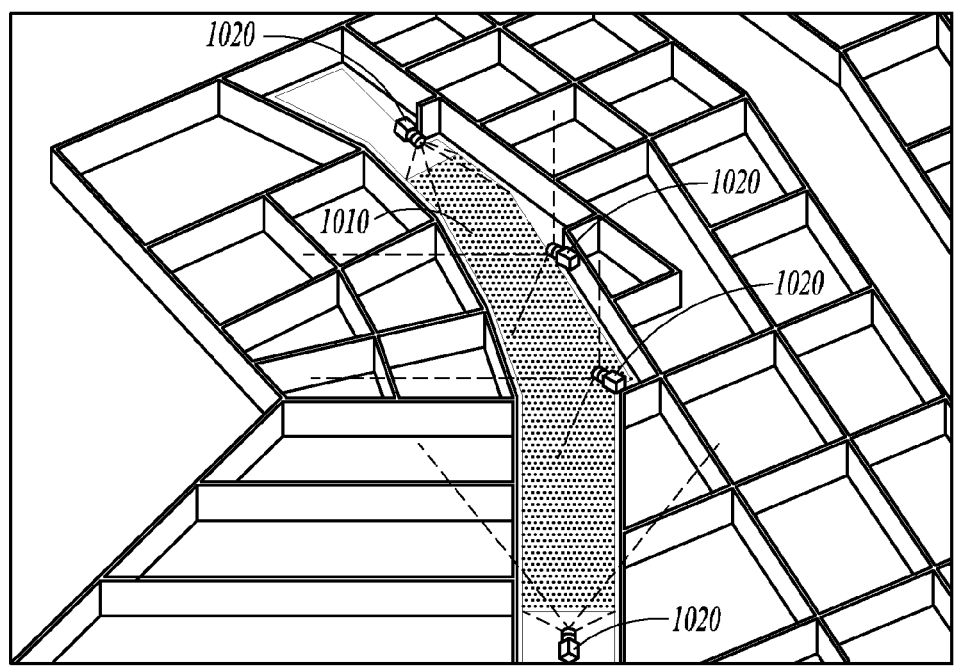
FIG. 10 illustrates a surveillance region and a coverage region of a virtual camera.

One or more embodiments evaluate the coverage percentage of the one or more virtual video sensing devices. In prior methods, a surveillance region was set by drawing polygons or brushing special colors on the two dimensional floor plan. This is convenient, but such a method needs the detailed two dimensional floor plan information, which is often unavailable for a three dimensional building model. Also, the height information for the surveillance is not included in a two dimensional model. In a current embodiment, users can draw the surveillance region directly in the three dimensional scene. For example, a polygon with colored edges can be used to indicate the expected surveillance region. This is illustrated in FIG. 9 with the expected surveillance region 910 that is outlined by polygon perimeter 920. FIG. 10 illustrates the coverage area 1010 that can be obtained by the positioning of four video sensing devices 1020.

An embodiment further calculates the extent of coverage compared with the desired surveillance region. So, when virtual camera placement is finished, the perspective of the scene can be changed to the perspective when the user set the surveillance region. The coverage region of the cameras can then be displayed.

The extent of the coverage can be calculated by the following equation.

$$\text{Coverage\_rate} = \frac{\text{Coverage\_region} \cap \text{Surveillance\_region}}{\text{Surveillance\_region}}$$

The Coverage_region represents the area 1010 of the region covered by the virtual cameras as positioned for example in FIG. 10. The Surveillance_region represents the area of surveillance region displayed in FIG. 10 by the total areas of 1010 and 1020. Coverage percentage can be important to the placement of cameras, can guide a user to modify the parameters of cameras to meet the requirement of the surveillance, and can be used to evaluate the quality of the camera placement. The overlap rate of coverage area can also be calculated. The overlap area refers to an area that is covered by more than one camera. In order to get the most optimized solution, the extent of overlap should be minimized. The Coverage_region_gross is defined as Σ(Coverage_each_camera∩Surveillance_region). So the Overlap can be represented as:

$$\text{Overlap\_rate} = \frac{\text{Coverage\_region\_gross} - \text{Coverage\_region} \cap \text{Surveillance\_region}}{\text{Coverage\_region} \cap \text{Surveillance\_region}}$$

Figure 11A:
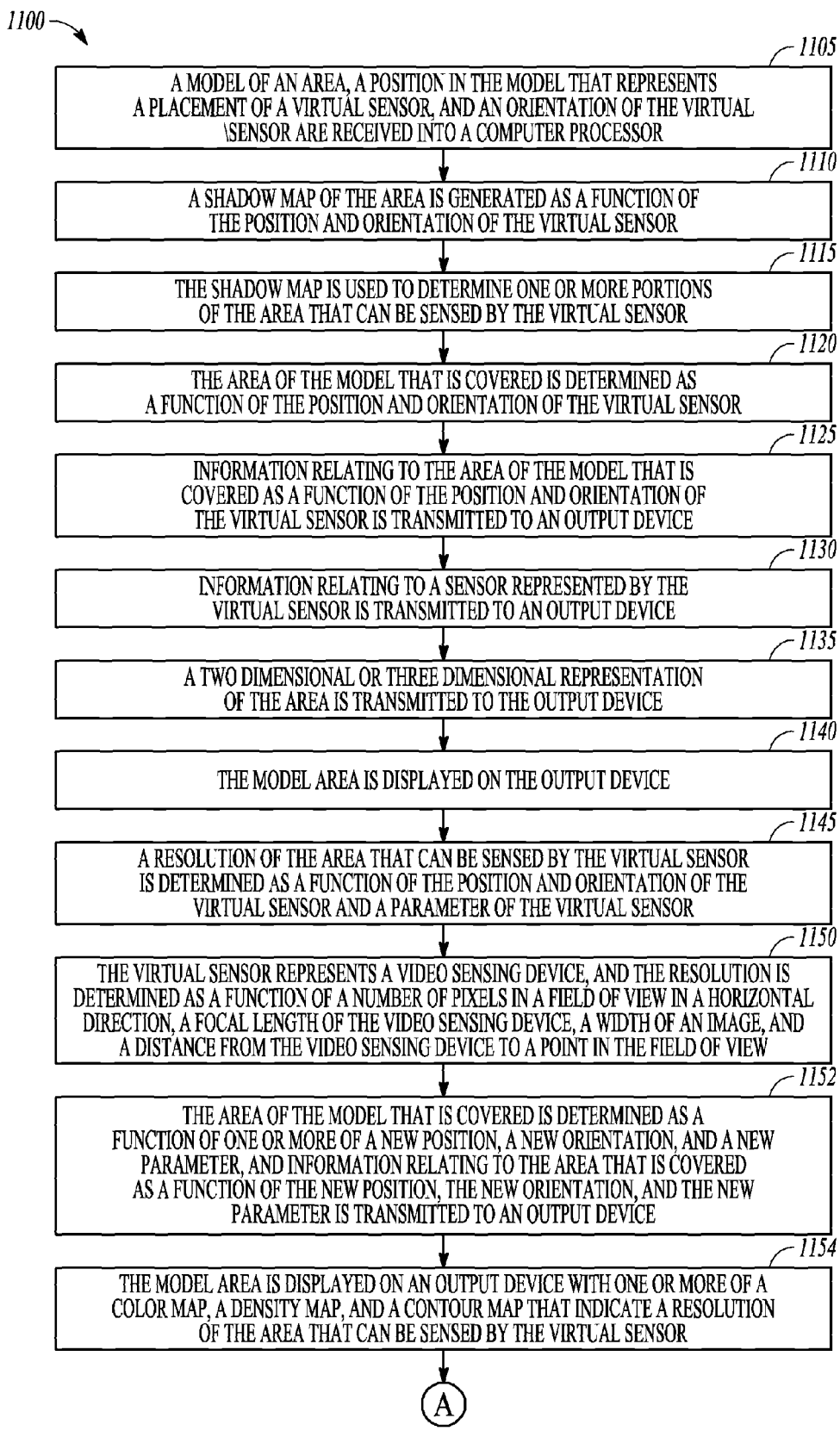
FIGS. 11A and 11B are a flowchart of an example process for determining sensor placement using a virtual environment
Figure 11B:
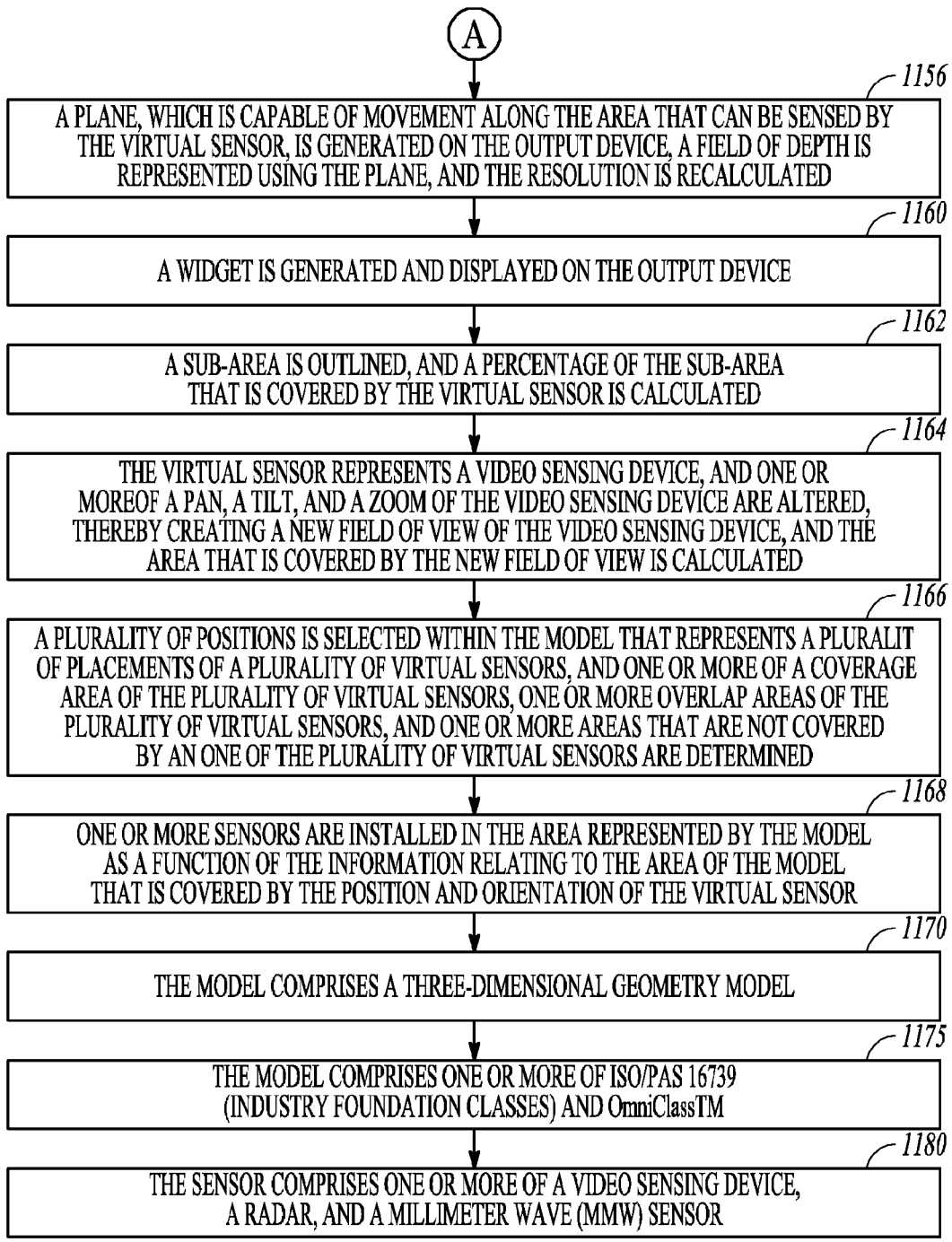

FIGS. 11A and 11B are a flowchart of an example process 1100 for determining sensor placement using a virtual environment. FIGS. 11A and 11B include a number of process blocks 1105-1180. Though arranged serially in the example of FIGS. 11A and 11B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 11A and 11B, at 1105, a model of an area, a position in the model that represents a placement of a virtual sensor, and an orientation of the virtual sensor are received into a computer processor. At 1110, a shadow map of the area is generated as a function of the position and orientation of the virtual sensor. At 1115, the shadow map is used to determine one or more portions of the area that can be sensed by the virtual sensor. At 1120, the area of the model that is covered is determined as a function of the position and orientation of the virtual sensor. At 1125, information relating to the area of the model that is covered as a function of the position and orientation of the virtual sensor is transmitted to an output device.

At 1130, information relating to a sensor represented by the virtual sensor is transmitted to an output device. The information includes one or more of a sensor type, a sensor location, a sensor orientation, and a sensor cost. At 1135, a two dimensional or three dimensional representation of the area is transmitted to the output device. The representation includes dimension information relating to the position of the virtual sensor. At 1140, the model area is displayed on the output device. The display of the model area indicates the one or more portions of the area that can be sensed by the virtual sensor and a portion of the area that cannot be sensed by the virtual sensor. At 1145, a resolution of the area that can be sensed by the virtual sensor is determined as a function of the position and orientation of the virtual sensor and a parameter of the virtual sensor. At 1150, the virtual sensor represents a video sensing device, and the resolution is determined as a function of a number of pixels in a field of view in a horizontal direction, a focal length of the video sensing device, a width of an image, and a distance from the video sensing device to a point in the field of view.

At 1152, the area of the model that is covered is determined as a function of one or more of a new position, a new orientation, and a new parameter, and information relating to the area that is covered as a function of the new position, the new orientation, and the new parameter is transmitted to an output device. At 1154, the model area is displayed on an output device with one or more of a color map, a density map, and a contour map that indicate a resolution of the area that can be sensed by the virtual sensor. In an embodiment, different levels of resolution can be benchmarked, and a user can choose from these different levels of resolution. At 1156, a plane, which is capable of movement along the area that can be sensed by the virtual sensor, is generated on the output device, a field of depth is represented using the plane, and the resolution is recalculated.

At 1160, a widget is generated and displayed on the output device. The widget is associated with a control device to allow a user to alter the orientation of the virtual sensor. At 1162, a sub-area is outlined, and a percentage of the sub-area that is covered by the virtual sensor is calculated. At 1164, the virtual sensor represents a video sensing device, and one or more of a pan, a tilt, and a zoom of the video sensing device are altered, thereby creating a new field of view of the video sensing device, and the area that is covered by the new field of view is calculated. At 1166, a plurality of positions is selected within the model that represents a plurality of placements of a plurality of virtual sensors, and one or more of a coverage area of the plurality of virtual sensors, one or more overlap areas of the plurality of virtual sensors, and one or more areas that are not covered by any one of the plurality of virtual sensors are determined. At 1168, one or more sensors are installed in the area represented by the model as a function of the information relating to the area of the model that is covered by the position and orientation of the virtual sensor. At 1170, the model comprises a three-dimensional geometry model, and at 1175, the model comprises one or more of ISO/PAS 16739 (Industry Foundation Classes) and Omni-Class™. At 1180, the sensor comprises one or more of a video sensing device, a radar, and a millimeter wave (MMW) sensor.

Figure 12:
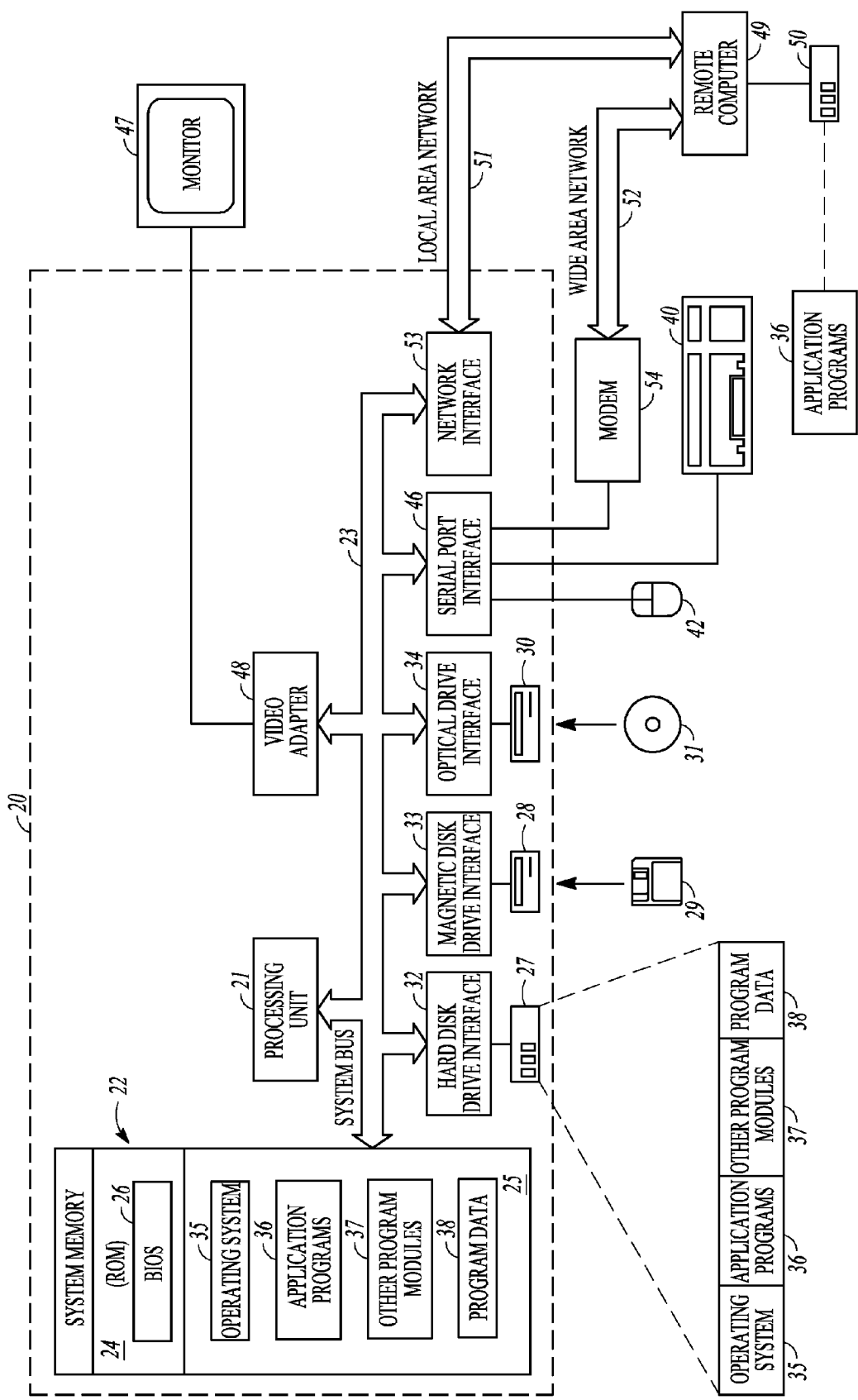
FIG. 12 illustrates a computer processor system upon which one or more embodiments of the current disclosure can execute.

FIG. 12 is an overview diagram of a hardware and operating environment in conjunction with which embodiments of the invention may be practiced. The description of FIG. 12 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 12, a hardware and operating environment is provided that is applicable to any of the servers and/or remote clients shown in the other Figures.

As shown in FIG. 12, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 12 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

Thus, an example system and method for sensor placement and analysis have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   receiving into a computer processor a model of an area;
   receiving into the computer processor a position in the model that represents a placement of a virtual sensor;
   receiving into the computer processor an orientation of the virtual sensor;
   generating with the computer processor a shadow map of the area as a function of the position and orientation of the virtual sensor;
   using the shadow map to determine one or more portions of the area that can be sensed by the virtual sensor;
   determining with the computer processor the area of the model that is covered as a function of the position and orientation of the virtual sensor;
   transmitting to an output device information relating to the area of the model that is covered as a function of the position and orientation of the virtual sensor; and
   determining with the computer processor a resolution of the area that can be sensed by the virtual sensor as a function of the position and orientation of the virtual sensor and a parameter of the virtual sensor;
   wherein the virtual sensor represents a video sensing device, and wherein the resolution is determined as a function of a number of pixels in a field of view in a horizontal direction, a focal length of the video sensing device, a width of an image, and a distance from the video sensing device to a point in the field of view.

2. The process of claim 1, comprising transmitting to the output device information relating to a sensor represented by the virtual sensor, the information including one or more of a sensor type, a sensor location, a sensor orientation, and a sensor cost.

3. The process of claim 1, comprising transmitting a two dimensional or three dimensional representation of the area to the output device, the representation comprising dimension information relating to the position of the virtual sensor.

4. The process of claim 1, comprising displaying the model area on the output device, wherein the displaying indicates the one or more portions of the area that can be sensed by the virtual sensor and a portion of the area that cannot be sensed by the virtual sensor.

5. The process of claim 1, comprising:
   receiving into the computer processor one or more of a new position of the virtual sensor, a new orientation of the virtual sensor, and a new parameter of the virtual sensor;
   determining the area of the model that is covered as a function of one or more of the new position, the new orientation, and the new parameter; and
   transmitting to the output device information relating to the area that is covered as a function of the new position, the new orientation, and the new parameter.

6. The process of claim 1, comprising:
   displaying on the output device the model area with one or more of a color map, a density map, and a contour map that indicate a resolution of the area that can be sensed by the virtual sensor;
   benchmarking different levels of resolution; and
   enabling a user to choose from the different levels of resolution.

7. The process of claim 1, comprising:
   using the computer processor to generate a plane on the output device, the plane capable of movement along the area that can be sensed by the virtual sensor;
   using a distance between the plane and the virtual sensor to represent a field of depth; and
   using the computer processor to recalculate the resolution.

8. The process of claim 1, comprising generating with the computer processor and displaying on the output device a widget, the widget associated with a control device to allow a user to alter the orientation of the virtual sensor.

9. The process of claim 1, comprising:
   using the computer processor to outline a sub-area; and
   calculating a percentage of the sub-area that is covered by the virtual sensor.

10. The process of claim 1, wherein the virtual sensor represents a video sensing device, and comprising:

using the computer processor to alter one or more of a pan, a tilt, and a zoom of the video sensing device, thereby creating a new field of view of the video sensing device; and using the computer processor to calculate the area that is covered by the new field of view.

11. The process of claim 1, comprising:
using the computer processor to select a plurality of positions within the model that represents a plurality of placements of a plurality of virtual sensors; and
using the computer processor to determine one or more of a coverage percentage of the plurality of virtual sensors, one or more overlap areas of the plurality of virtual sensors, and one or more areas that are not covered by any one of the plurality of virtual sensors.

12. The process of claim 1, comprising installing one or more sensors in the area represented by the model as a function of the information relating to the area of the model that is covered by the position and orientation of the virtual sensor.

13. The process of claim 1, wherein the model comprises a three-dimensional geometry model.

14. The process of claim 13, wherein the model comprises one or more of ISO/PAS 16739 (Industry Foundation Classes) and OmniClass™.

15. The process of claim 1, wherein the sensor comprises one or more of a video sensing device, a radar, and a millimeter wave (MMW) sensor.

16. A non-transitory computer readable medium comprising instructions that when executed by a computer processor executes a process comprising:
receiving into a computer processor a model of an area;
receiving into the computer processor a position in the model that represents a placement of a virtual sensor;
receiving into the computer processor an orientation of the virtual sensor;
generating with the computer processor a shadow map of the area as a function of the position and orientation of the virtual sensor;
using the shadow map to determine one or more portions of the area that can be sensed by the virtual sensor;
determining with the computer processor the area of the model that is covered as a function of the position and orientation of the virtual sensor;
transmitting to an output device information relating to the area of the model that is covered as a function of the position and orientation of the virtual sensor;
selecting a plurality of positions within the model that represents a plurality of placements of a plurality of virtual sensors; and
determining one or more of a coverage percentage of the plurality of virtual sensors, one or more overlap areas of the plurality of virtual sensors, and one or more areas that are not covered by any one of the plurality of virtual sensors.

* * * * *